(12) United States Patent
Yang

(10) Patent No.: US 7,917,947 B2
(45) Date of Patent: Mar. 29, 2011

(54) SECURED COMMUNICATION CHANNEL BETWEEN IT ADMINISTRATORS USING NETWORK MANAGEMENT SOFTWARE AS THE BASIS TO MANAGE NETWORKS

(75) Inventor: Alan Yang, Palo Alto, CA (US)

(73) Assignee: O2Micro International Limited, Grand Cayman (KY)

( * ) Notice: Subject to any disclaimer, the term of this patent is extended or adjusted under 35 U.S.C. 154(b) by 978 days.

(21) Appl. No.: 11/805,970

(22) Filed: May 24, 2007

(65) Prior Publication Data

US 2007/0277236 A1    Nov. 29, 2007

Related U.S. Application Data

(60) Provisional application No. 60/808,764, filed on May 26, 2006.

(51) Int. Cl.
*G06F 9/00* (2006.01)
*G06F 7/04* (2006.01)
*H04L 9/00* (2006.01)

(52) U.S. Cl. ............ 726/15; 726/3; 726/4; 726/5; 726/6; 726/7; 713/151; 713/152; 713/153; 713/154

(58) Field of Classification Search ................. 726/15
See application file for complete search history.

(56) References Cited

U.S. PATENT DOCUMENTS

| | | | |
|---|---|---|---|
| 6,584,564 B2 * | 6/2003 | Olkin et al. | 713/152 |
| 7,430,755 B1 * | 9/2008 | Hughes et al. | 726/3 |
| 2003/0081783 A1 | 5/2003 | Adusumilli et al. | |

* cited by examiner

*Primary Examiner* — Longbit Chai

(57) ABSTRACT

A network management system is used to secure a communications channel between at least two clients. The network management system includes a network management server which includes network management software. The network management server is coupled to the clients for managing the communication between the clients. The network management system further includes at least two secured communication channels established by the network management server between the network management server and each of the clients, respectively, such that the at least two clients can securely communicate with each other.

19 Claims, 2 Drawing Sheets

SECURED COMMUNICATION CHANNEL BETWEEN IT ADMINISTRATORS USING NETWORK MANAGEMENT SOFTWARE AS THE BASIS TO MANAGE NETWORKS

CROSS REFERENCE TO PROVISIONAL APPLICATION

This application claims priority to the co-pending provisional patent application Ser. No. 60/808,764, entitled "Secured Communication Channel between IT Administrators Using Network Management Software as the Basis to Manage the Networks," with filing date May 26, 2006, and assigned to the assignee of the present invention, which is herein incorporated by reference in its entirety.

TECHNICAL FIELD

The present invention is related to a network management system, and more particularly, to a network management system deployed at an enterprise or Internet service provider (ISP) level to manage a customer network.

BACKGROUND ART

With the development of Information Technology (IT), the quantity of data transmitted has increased dramatically. Accordingly, businesses pay increased attention to the integrity and reliability of their own information.

While managing company, enterprise or customer networks that are provided by an Internet Service Provider (ISP), an IT administrator needs to communicate securely. Because confidential information of the enterprise can be involved, security is very important. In a conventional approach, a separate communication line needs to be provided, either through phone, or other personal communication devices, to meet the security requirement. However, it is not convenient, and is expensive.

SUMMARY OF THE INVENTION

It is an object of the present invention to provide an apparatus and a method for securing communications between at least two clients.

In order to achieve the above object, the present invention provides a network management system for securing communication between at least two clients. The network management system comprises a network management server which comprises network management software. The network management server is coupled to the clients for managing communications between the clients. The network management system further includes at least two secured communication channels established by the network management server between the network management server and each of the clients, respectively, such that the at least two clients can communicate securely with each other.

BRIEF DESCRIPTION OF THE DRAWINGS

Other objectives, advantages, and novel features of the invention will become more apparent from the following detailed description when taken in conjunction with the accompanying drawings.

DESCRIPTION OF THE EMBODIMENTS

Reference will now be made in detail to the embodiments of the present invention, secured communication channel between IT administrators using network management software as the basis to manage networks. While the invention will be described in conjunction with the embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Figure 1:
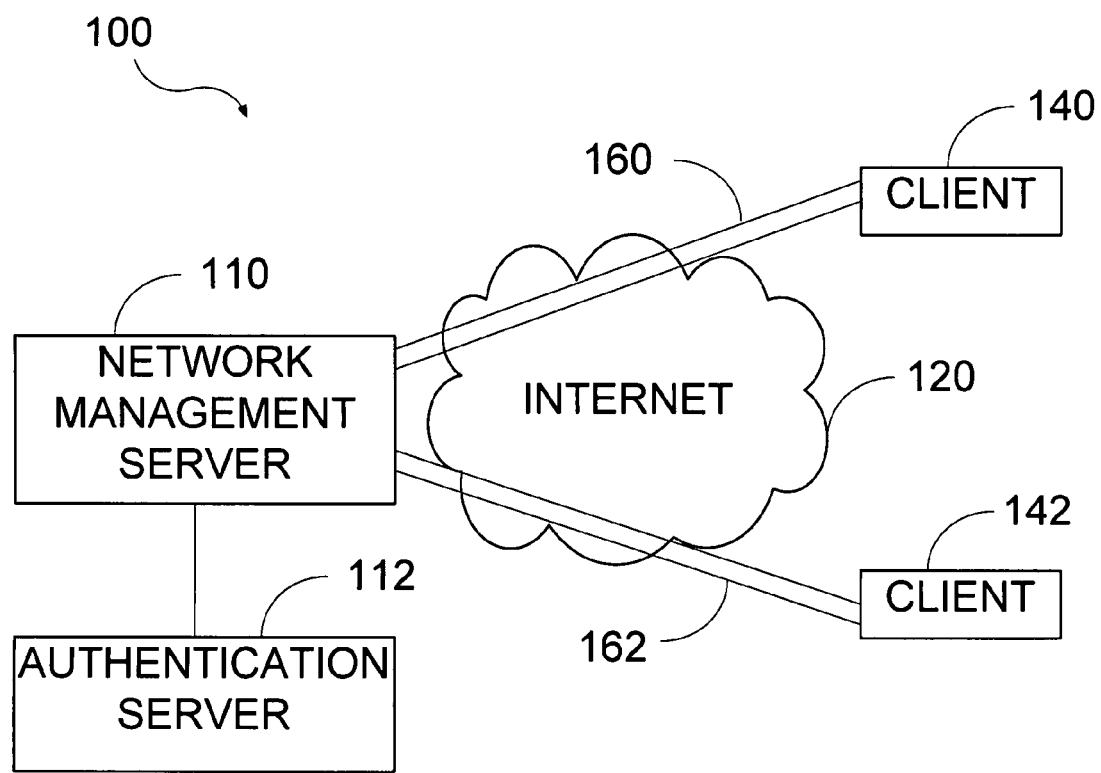
FIG. 1 is a block diagram showing a physical construction of a network management system for managing clients for secured communication, in accordance with one embodiment of the present invention.

Referring to FIG. 1, a block diagram showing a physical construction of a network management system 100 for managing clients for secured communication is illustrated, in accordance with one embodiment of the present invention. The network management system 100 mainly comprises a network management server 110 and a plurality of clients, for example, clients 140 and 142.

The network management system 110 which has a network management software is coupled to the clients 140 and 142 through a network, such as Internet 120, to perform as a proxy server to manage clients 140 and 142 for secured communication. The clients 140 and 142 can be user terminals, such as Personal Computers (PCs) and work stations. In one embodiment, when the client 140 serves as a message producer client and makes the login request to the network management server 110 through Remote Method Invocation (RMI), for instance, the network management software provides the client 140 login account information that can comprise login type, account, password, client IP address and so on.

In accordance with one embodiment of the present invention, Java RMI (Remote Method Invocation) is a mechanism that allows invoking a method on an object existing in another address space. The address spaces can be in the same machine or in different machines. The RMI mechanism is basically an object-oriented Remote Procedure Call (RPC) mechanism which is a communication mechanism that allows one Unix process to communicate with another Unix process. Referring now back to the FIG. 1, the network management server 110 is the remote object for the client 140. The client 140 can make a login request to the network management server 110, and invoke methods on the network management server 110 by means of Java RMI.

The network management server 110 is coupled to an external authentication server 112 which can provide Lightweight Directory Access Protocol (LDAP), Active Directory, or Remote Authentication Dial-in User Service (RADIUS), according to embodiments of the present invention. By associating the authentication server 112, the network management server 110 can authenticate the client 140. For example, LDAP provides an alternative based on the X.500 standard. The X.500 standard defines how global reference directories of people should be structured. The X.500 directories are organized under a common root directory in a tree hierarchy with different levels for each category of information, such as country, state, city, organization, organizational unit, and person. Designed to provide a simpler yet robust implementation of X.500, LDAP was originally used as the backbone of Active Directory Service by Microsoft® and Novell Directory Services products by Novell®.

LDAP has the capability of interacting with other login programs, such as the above-mentioned RADIUS, which the network equipment of many Internet service providers use to manage dialup Internet access. When a user logs into the network equipment, a username/password combination is sent to the RADIUS server. The RADIUS server queries the LDAP server to see if the user is a valid one. If yes, the RADIUS server replies to the network equipment with the desired login privileges.

Referring now back to the FIG. 1, when the network management server 110 receives the login request from the client 140, the network management server 110 queries the authentication server 112 to authenticate the legitimacy of the client 140 through Java Management Extensions (JMX) of RMI. The JMX technology provides the tools for building distributed Web-based, modular and dynamic solutions for managing and monitoring devices, applications, and service driven networks. The authentication data is stored and configured in the authentication server 112 in advance. By comparing data, such as usernames and passwords, with the authentication data in the authentication server 112, the network management server 110 decides whether the client 140 can log in. If yes, the network management server 110 returns the login results to the client with serial ID for tracking, permission list for managing privilege, and login timestamp. For client 142, the login step is similar to that of the client 140. For clarity and brevity, the description of the login step of the client 142 will not be presented.

There may be various reasons for clients to make secured communications. For example, when the network management server 110 performs as a topology server, it subscribes to a database service performed by the network management server 110 or other server (not shown in FIG. 1) to receive a network element change notification message. Since the network management server 110 has a topology tree, the network management server 110 will receive a network management change message and topology change message when there is any change that occurs to the topology. When the client 140 uses the network management server 110 to communicate with another client or another server, the topology tree is loaded from the network management server 110 through RMI, and the change message is subscribed to the client 140. After the client 140 receives the message indicating that the topology has changed, the topology view on the client side will change accordingly. The client 140, for instance, serving as an IT administrator, can securely communicate with or securely transmit massages to the client 142, for instance, serving as support personnel, about the topology change which is the internal and confidential information of the organization.

In one embodiment, the client 140 as the message producer client may send a message regarding the topology change to the client 142 as a message consumer client. The message can indicate message type, message producer, message consumer, content, file name, time stamp and so on, which is transmitted through the secured communication channels 160 and 162. The secured communication channels 160 and 162 comply with an encryption protocol, such as Secure Sockets Layer (SSL) protocol, IP security (IPsec) protocol. The SSL protocol, for instance, provides communications privacy over the Internet 120 between two communication applications, such as the client 140 and the network management server 110 in accordance with one embodiment of the present invention.

The SSL protocol is composed of two layers. The lower level includes the SSL record protocol layered on top of some reliable transport protocol, such as Transmission Control Protocol (TCP) which is responsible for verifying the correct delivery of data from a client to a server. The SSL record protocol is used for encapsulation of various higher level protocols, such as SSL handshake protocol, SSL change cipher spec protocol, and SSL alert protocol. For example, the SSL handshake protocol allows the server and client to authenticate each other and to negotiate an encryption algorithm and cryptographic keys before the application protocol transmits or receives its first byte of data.

In accordance with one embodiment of the present invention, the login client 140 may send a client hello message in response to a server hello message which the network management server 110 sends through a TCP connection. The hello messages establish connection attributes which may include the protocol version, a session identifier, the cipher suite, the compression method as well as random values for both the network management server 110 and the client 140. After the hello messages are exchanged, the network management server 110 will send its certificate, and the client 140 will send its certificate as well. Then the network management server 110 instructs the client 140 to start using encryption, and then finishes the initial handshake, when the data transmission can be implemented. As such, the secured communication channel 160 between the client 140 and the network management server 110 is successfully established. During the transmission, as the data is lost through the Internet 120, TCP can detect errors or lost data, and trigger retransmission until the data is correctly and completely received.

Furthermore, in one embodiment, the client 140 and the network management server 110 can reside in a same subnet. It will be apparent for those skilled in the art that in one embodiment, the Internet 120 may not exist and the communication channel 160 may actually be hardware coupled to the client 140 and the network management server 110.

Through the established communication channel 160, the message which comprises the information of the message consumer client 142 sent from the client 140 is obtained by the network management server 110. By means of the steps similar to those for establishing a secured communication channel 160, the secured communication channel 162 between the network management server 110 and the client 142 can be established. The network management server 110 forwards the message to the client 142 through the secured communication channel 162. Similarly to the communication channel 160, the communication channel 162 can also be hardware when the client 142 and the network management 110 reside in a same subnet.

The network management server 110 provides a Graphics User Interface (GUI) for presenting information related to a communication to the login clients. In one embodiment, when the message consumer client 142 receives the message forwarded by the proxy or network management server 110 from the message producer client 140, the information indicating that a new message has come and the contents of the message will be shown on the monitor of the network management server 110 by invoking the GUI provided by the network management server 110.

The type of message transmitted between the clients 140 and 142 through the network management server 110 may be text, picture, voice and so on. When the message transmitted between the clients 140 and 142 through the secured communication channels 160 and 162 are voice based, the transmission complies with the Voice over Internet Protocol (VoIP). By means of VoIP, the audio signal from the client 140 can be converted into a digital signal that travels over Internet 120, and then the digital signal can be converted back to an audio signal when the signal reaches the client 142.

It will be apparent for those skilled in the art that the secured communication channel used in accordance with embodiments of the present invention is more economical and convenient than using a leased private communication line in conventional method.

Figure 2:
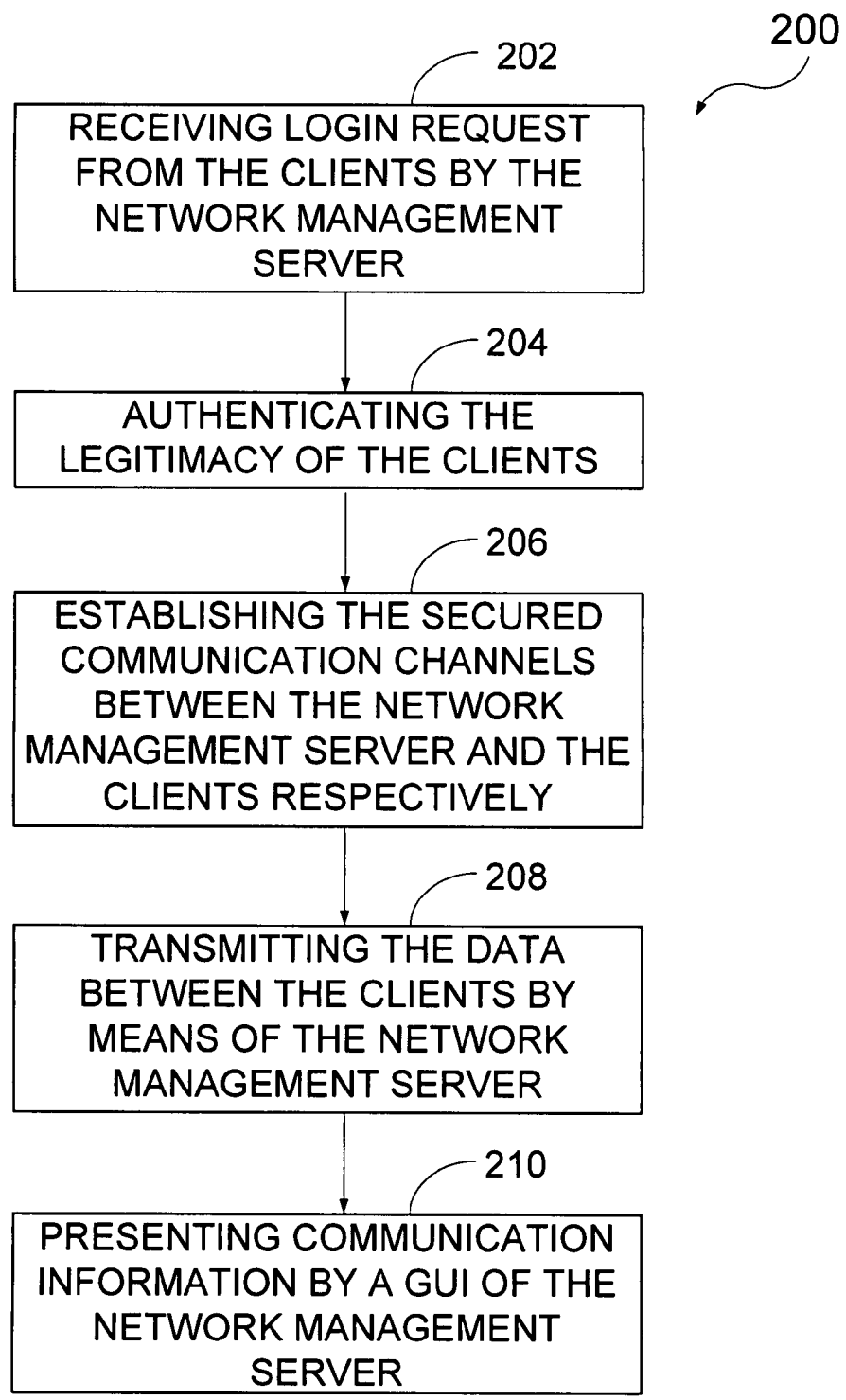
FIG. 2 is a block diagram showing a method for secured communication between at least two clients, in accordance with one embodiment of the present invention.

Referring to FIG. 2, a process 200 for secured communication between at least two clients, in accordance with one embodiment of the present invention, is illustrated. At 202, one of at least two clients makes a login request to a network management server through Remote Method Invocation (RMI) for instance. Through RMI, the client can invoke a method on the remote object of the network management server. The network management server coupled to the two clients through a network, such as the Internet, includes network management software to perform as a proxy server for managing secured communication between the two clients. After receiving the login request, the network management server begins to authenticate the clients.

At 204, the network management server queries an authentication server to authenticate the legitimacy of the client through Java Management Extensions (JMX) of RMI. The JMX technology provides the tools for building distributed Web-based, modular and dynamic solutions for managing and monitoring devices, applications, and service driven networks. The authentication server is coupled to the network management server for authenticating the clients in association with the network management server. Through comparing data, such as usernames and passwords, with stored or configured data in the authentication server 112, the authentication server decides whether the client passes the authentication. If the client passes authentication, the network management server returns the login results to the client with serial ID for tracking, permission list for managing privilege and login timestamp. If not, the process 200 will be stopped.

At 206, after authentication, the network management software provides encryption and decryption methods for establishing the secured communication channels between the network management server and the clients (e.g., 140 and 142 in FIG. 1), respectively. The data transmitted between the clients may comprise message type, message producer, message consumer, content, file name, time stamp and so on, is transmitted through Secure Sockets Layer (SSL) protocol, for instance. The SSL protocol provides communications privacy over the network between two communication applications, for example, the clients and the network management server.

In accordance with one embodiment of the present invention, the login client sends a client hello message in response to a server hello message which the server sends through a TCP connection. The hello messages establish connection attributes which may include the protocol version, a session identifier, the cipher suite, and the compression method as well as random values for both the server and the client. After the hello messages are exchanged, the server and the client will send their own certificate to each other. Then, the server instructs the client to start using encryption and then finishes the initial handshake, when the data transmission can be implemented. As such, the secured communication channel between the client and the network management server is successfully established.

At 208, when the login client sends a message to the other login client, the network management server operates as a proxy server according to one embodiment of the present invention. The network management server forwards the message between the two login clients through the established secured communication channels. During the transmission, when the data is lost, TCP can add support to detect errors or lost data, and to trigger retransmission until the data is correctly and completely received. As such, the data can be transmitted securely between the two login clients.

At 210, the network management server provides a Graphics User Interface (GUI) for presenting information to the login clients. When the client receives the message forwarded by the network management server, the information indicates that a new message has come in and the contents of the message will be shown by invoking the GUI provided by the network management server.

While the foregoing description and drawings represent the preferred embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims and their legal equivalents, and not limited to the foregoing description.

What is claimed is:

1. A network management system for providing secure communication between a plurality of clients, said network management system comprising:
   a network management server which comprises network management software, and is coupled to each of said clients, operable for managing the communication between said clients, for updating a topology change of said network management system, and for notifying a client of said clients about said topology change based on a received network element change notification message; and
   a plurality of secured communication channels established by said network management server and comprising a first secured communication channel between said network management server and a first client of said clients and a second secured communication channel between said network management server and a second client of said clients, such that said first and second clients are enabled to securely communicate with each other through said network management server over said first and second secured communication channels, and wherein said notified client is able to securely transmit a message regarding said updated topology change to the other client over said established secured communication channels.

2. The network management system as claimed in claim 1, wherein said secured communication channels are established by said network management software of said network management server.

3. The network management system as claimed in claim 1, wherein said network management server is coupled to said at clients through a network.

4. The network management system as claimed in claim 3, wherein said network is the Internet.

5. The network management system as claimed in claim 1, wherein one of said clients is coupled to said network management server through hardware.

6. The network management system as claimed in claim 1, wherein said network management software comprises a Graphics User Interface (GUI) for presenting communication information between said network management server and said clients.

7. The network management system as claimed in claim 1, further comprising:
an authentication server coupled to said network management server, for comparing data from said first and second clients with authentication data stored in said authentication server, and for authenticating said first and second clients.

8. The network management system as claimed in claim 1, wherein a secured communication channel of said secured communication channels complies with Secure Sockets Layer (SSL) protocol.

9. The network management system as claimed in claim 1, wherein said secured communication channels are capable of being used to transmit audio signals.

10. The network management system as claimed in claim 9, wherein said secured communication channels comply with Voice over Internet Protocol (VoIP).

11. A method for establishing secure communication between a plurality of clients, said method comprising:
establishing a plurality of secured communication channels between a network management server and each of said clients, respectively, wherein said secured communication channels are operable for transmitting messages between said clients via said network management server;
updating a topology change associated with said clients, said secured communication channels and said network management server; and
notifying a client of said clients about said topology change based on a received network element change notification message, and wherein said notified client is able to securely transmit a message regarding said updated topology change to the other client over said established secured communication channels.

12. The method as claimed in claim 11, wherein said establishing further comprises:
storing authentication data in an authentication server; and
authenticating legitimacy of said clients through said authentication data.

13. The method as claimed in claim 11, wherein said network management server is coupled to said clients through a network.

14. The method as claimed in claim 13, wherein said network is the Internet.

15. The method as claimed in claim 11, wherein said establishing further comprises:
identifying encryption and decryption methods.

16. The method as claimed in claim 15, wherein said encryption and decryption methods comply with Secure Socket Layer (SSL) protocol.

17. The method as claimed in claim 11, wherein said transmitting comprises:
transmitting audio signals between said clients through said secured communication channels and said network management server.

18. The method as claimed in claim 17, wherein said transmitting comprises:
using Voice over Internet Protocol (VoIP) technology for transmitting said audio signals through said secured communication channels.

19. The method as claimed in claim 11, further comprising:
presenting communication information of said clients.

* * * * *